May 18, 1948.　　　L. T. MORAWSKI　　　2,441,832
INDEXING FIXTURE
Filed May 17, 1946　　　3 Sheets-Sheet 1

INVENTOR.
London T. Morawski.
BY
Harness, Dickey & Pierce.
ATTORNEYS.

May 18, 1948. L. T. MORAWSKI 2,441,832
INDEXING FIXTURE
Filed May 17, 1946 3 Sheets-Sheet 2

INVENTOR.
London T. Morawski.
BY
Harness, Dickey & Pierce.
ATTORNEYS.

May 18, 1948.  L. T. MORAWSKI  2,441,832
INDEXING FIXTURE
Filed May 17, 1946   3 Sheets-Sheet 3
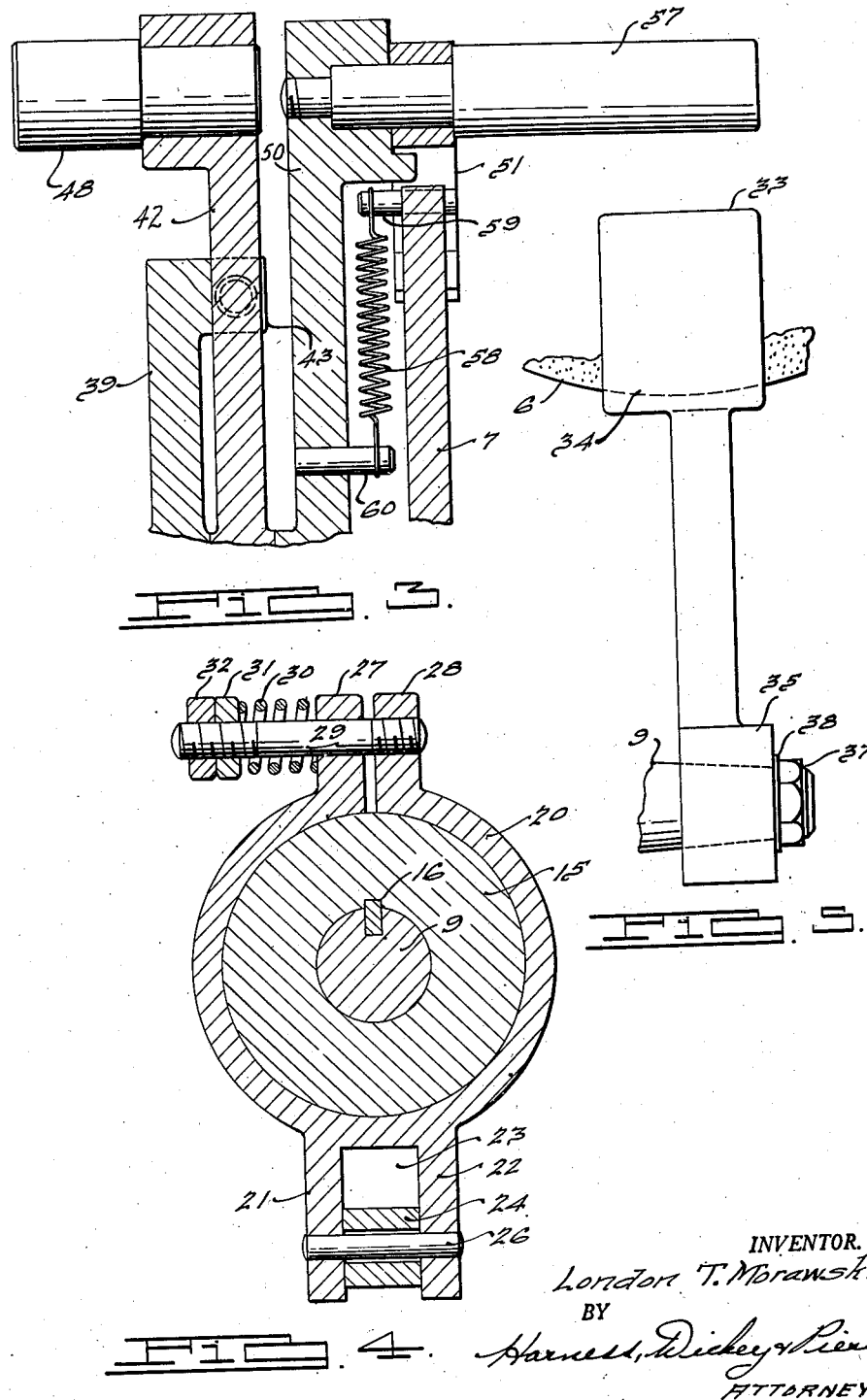
INVENTOR.
London T. Morawski
BY
Harness, Dickey & Pierce
ATTORNEYS.

Patented May 18, 1948

2,441,832

UNITED STATES PATENT OFFICE 2,441,832

INDEXING FIXTURE

London T. Morawski, Detroit, Mich., assignor to Michigan Tool Company, Detroit, Mich., a corporation of Delaware Application May 17, 1946, Serial No. 670,456

5 Claims. (Cl. 51—216)

1

The present invention relates to fixtures and, more particularly, relates to an index fixture which may be used to radially divide an index plate accurately and precisely so that the same may be properly ground.

Various methods are used at present to produce index plates having uniformly spaced notches. Each has the disadvantage of being slow and may be satisfactorily practiced only by an extremely skilled operator to produce an accurate index plate.

Consequently, it is the primary object of the present invention to provide a fixture which may be used to accurately and precisely radially divide an index plate in order to grind uniformly spaced notches throughout the circumference thereof.

Another object of the present invention is to provide a fixture to be used in this manner which may be used by a semi-skilled or relatively unskilled operator.

A still further object of the present invention is to provide a fixture of this nature which is relatively simple in operation and capable of producing extremely accurate work.

Further objects and advantages of my invention will be apparent from the description which follows when considered in connection with the accompanying drawings in which like numerals indicate like parts wherever shown and wherein:

Figure 3 is a partially broken section taken substantially on the line 3—3 of Figure 1 illustrating the relationship of the sine bar and index lever;

Figure 4 is a section taken on line 4—4 of Figure 2 showing the brake for preventing rotation of the shaft of the fixture when desired; and Figure 5 is a partial elevational view illustrating a gaging means mounted on the spindle.

Figure 6 is a fragmentary cross-sectional view taken substantially along the line 6—6 of Figure 1.

Figure 1:
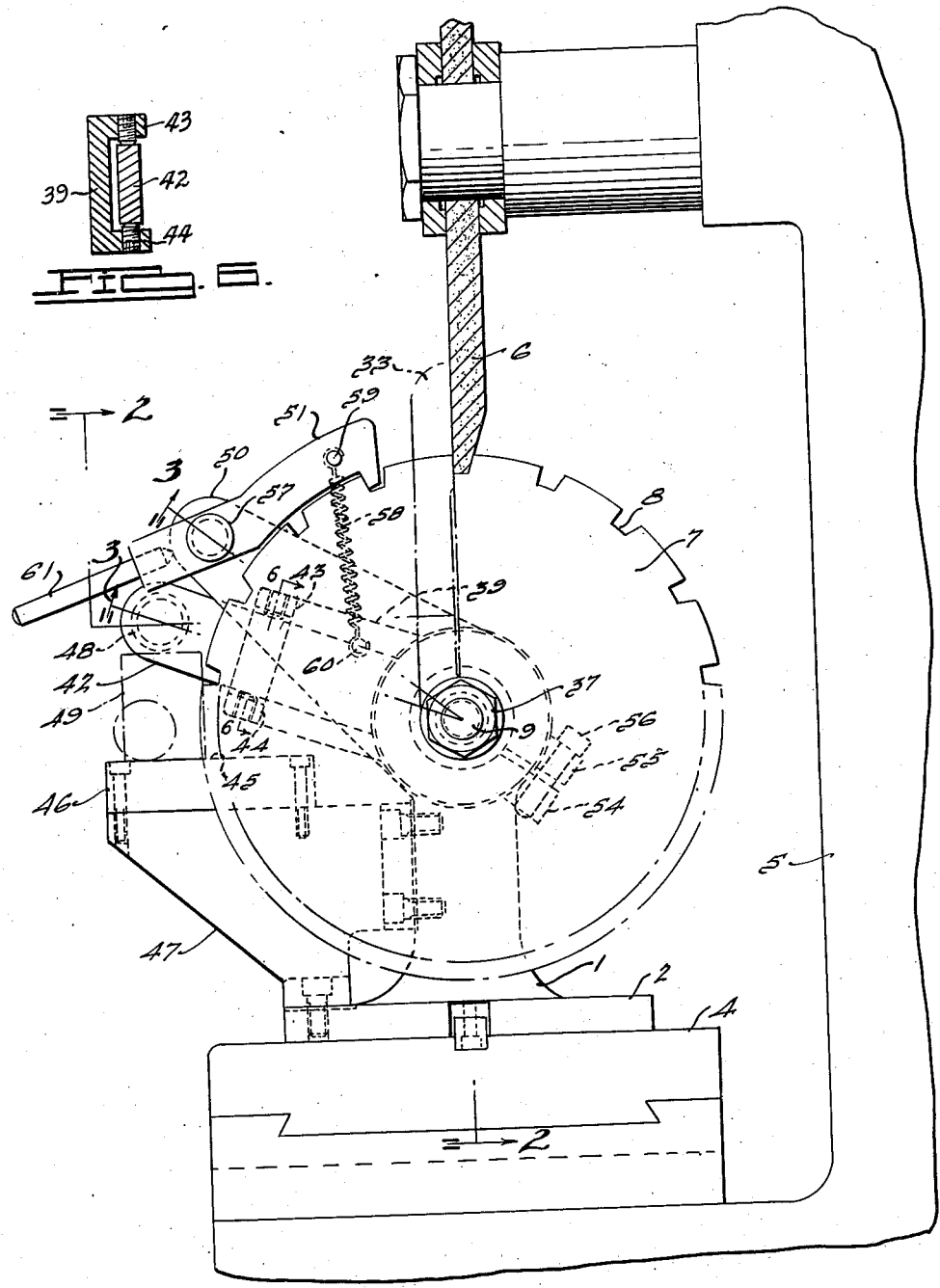
Figure 1 is a front elevational view illustrating a fixture embodying the improvements of the present invention mounted on a grinding machine.

According to the present invention, a sine bar is mounted on a spindle, adapted to rotatably support an index plate in which the notches are only roughly located. Such sine bar is so mounted that the same may be moved arcuately with, or independently of, such spindle and provides a gaging member by means of which it may be moved into accurate and precise predetermined angular relationship with respect to a gaging surface on the fixture. This angle at which the sine bar is

2 adjusted represents the central angle desired between the finished notches on the index plate. Means are opratively associated with the sine bar which may be brought into engagement with a notch in the index plate and as the sine bar is rotated to bring the gaging member on the sine bar into contact with the gaging surface of the fixture, such means effect rotation of the index plate through this predetermined angle to bring each unfinished notch into contact with a grinding wheel for accurately and precisely finishing the same.

Referring to the figures in order to more fully describe this invention, the fixture is shown provided with a base generally indicated at 1 which has the lower pedestal portion 2 and upper spindle housing 3. The fixture is shown as mounted by means of pedestal 2 on table 4 of a grinding machine 5 which provides a grinding wheel 6 driven by driving means located interiorly of the base in the usual manner.

It is assumed in the present instance that index plate 7 has roughed-out notches 8 which are to be finished by means of grinding wheel 6, and to provide for rotatably supporting the index plate in such manner that the same may be accomplished, a spindle 9 is journaled for rotation within ball assemblies 10 and 11, respectively, held within spindle housing 3.

These ball assemblies are retained within housing 3 by means of nuts 12 and 13 each of which is threadably received within said housing and it will be observed that when tightened therein each secures a respective bearing in position. As will hereinafter become more clear, a shoulder of the enlarged portion 14 on such shaft may be drawn tightly against the inner face of ball assembly 10, in order to prevent lateral shifting of spindle 9.

Figure 2:
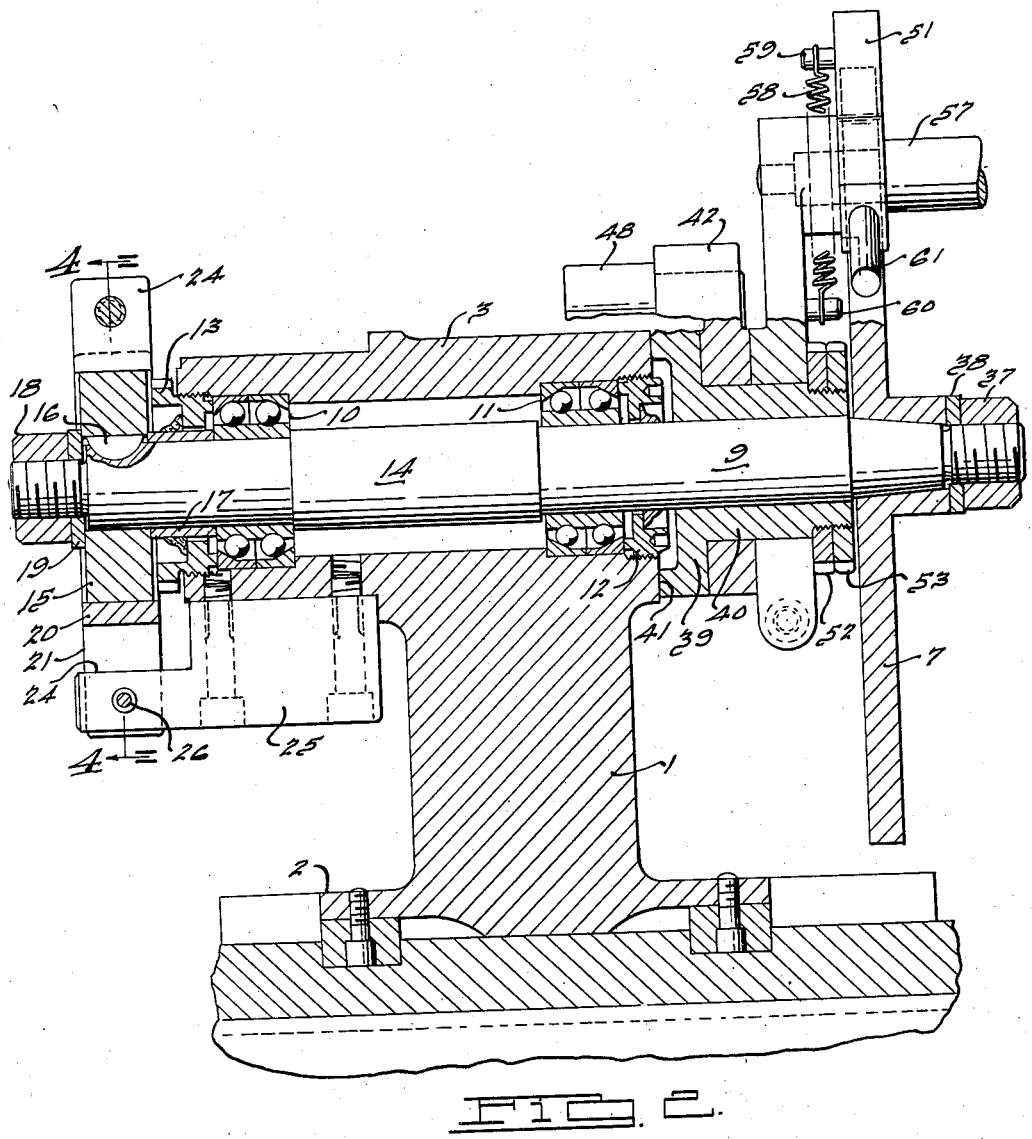
Figure 2 is a sectional elevation taken substantially on line 2—2 of Figure 1 and illustrating the arrangement of elements comprising such fixture.

It will, of course, be obvious that means must be provided to regulate the rotation of spindle 9 to prevent circumferential movement thereof as notches 8 on index plate 7 are presented to grinding wheel 6, if the same are to be accurately finished. For this purpose, an annular disk or drum 15 is keyed at 16 to the left end of spindle 9, and spaced from the outer face of bearing assembly 10 by means of spacer 17, as may be seen in Figure 2. A nut 18 threadably engaging said end of said spindle, when tightened, bears against washer 19 securing drum 15 thereat, causing a shoulder of portion 14, on shaft 9, to come into abutting relation with a face of bearing assembly 10. In surrounding relationship to drum 15, a split collar 20 is positioned to serve as a brake shoe. This shoe is provided, on its side diametrically opposite the split therein, with a pair of spaced, outwardly directed arms 21 and 22 so disposed and arranged as to form a groove 23 therebetween. This groove 23 is positioned to receive therein the outwardly directed lug or ear 24 machined on anchor block 25 secured to housing 3, and a pin 26 extending through mating openings provided in arms 21 and 22 and lug 24 prevents brake shoe or collar 20 from moving laterally with respect to drum 15. At the split in collar 20 a second pair of spaced outwardly directed arms 27 and 28 are arranged to be urged toward each other. This is accomplished in the following manner. A stud 29 is anchored in arm 28 and permitted to extend through an opening provided therefor in arm 27 for receiving, in encircling relationship thereto, the coiled spring 30, and to threadably receive nut 31 and lock nut 32 by means of which the force exerted by spring 30 may be varied, urging arms 27 and 28 toward each other. This, of course, effects shoe 17 to tighten on drum 15 serving to frictionally control the rotation of spindle 9.

Up to this point, gaging means for bringing the fixture of the present invention into operative position have not been described. Broadly, such means may take any form so long as the same may be used to bring the longitudinal axis of the spindle into the plane of the flat, outer face of wheel 6. For the purpose of illustration in this case, a setting gage generally indicated as 33 is shown in dashed lines, in Figure 1, mounted on spindle 9. Such gage, which is removed after the fixture is positioned in order that index plate 7 may be mounted on spindle 9, has the broad, flat-face head 34, as may be seen in Figure 5. Such face is flatly ground and lies in the plane of the longitudinal axis of collar 35 of this gage. Thus, when such gage is mounted on spindle 9, the flat face of head 34 may be brought into contact with the flat face of grinding wheel 6, and table 4 moved laterally until it is not possible to see light between the contacting faces of the gage and wheel. When this occurs, the operator will know that the longitudinal axis of spindle 9 is in the plane of the flat face of grinding wheel 6, and table 4 may be locked against lateral movement and setting gage 33 removed from the spindle.

At this time, index plate 7 may be mounted on spindle 9 and secured thereat by means of nut 37 and washer 38. As stated in the foregoing, it is assumed that notches 8 are in roughly finished form and index wheel 7, when thusly mounted, is so positioned that the formed peripheral edge of such grinding wheel may enter one of said notches, which may, of course, be any notch inasmuch as all are to be finished. With index plate 7 so mounted, the fixture of the present invention provides for rotating said index plate through an angle sufficient to accurately and precisely bring each notch thereafter into engagement with the grinding wheel after the first notch is finished. This is accomplished in the following manner.

A holder 39 having an integral sleeve 40 adapted to be received on spindle 9 is positioned thereon at the right end and provides the annular rim 41 adapted to abut the left-hand face of housing 3. A sine bar 42, having a circular opening in one end equal in diameter to the outer diameter of sleeve 40, is mounted on said sleeve with one face of the mounting portion of said sine bar abutting the face of holder 39 while the upper portion of said sine bar is positioned between two outwardly directed ears 43 and 44, respectively, on such holder. Said ears are provided on opposite edges of said holder 39 and are substantially normal to that surface of the holder which abuts sine bar 42. Each of such ears provides an adjusting screw adapted to be turned into engagement with a respective edge of sine bar 42, and it will be appreciated that by tightening the same, the sine bar may be positively secured to said holder. As will be hereinafter more clear, such screws provide for finely adjusting the angular relation of sine bar 42 with respect to a gaging surface 45 provided by gage block 46 which is supported by bracket 47 anchored to the base of the fixture.

It will be observed that an annular gaging pin 48 is fixed to the movable end of sine bar 42 and also that gaging surface 45 is located with respect to the center of spindle 9 so as to be one-half the diameter of pin 48 below said center. Thus, when sine bar 42 is moved so that gaging pin 48 contacts gaging surface 45, the longitudinal axis of said sine bar is accurately and precisely perpendicular to the plane of the flat face of the grinding wheel 6.

By means of a gage block or other measuring means, as indicated at 49, placed between gaging surface 45 and gaging pin 48, sine bar 42 may be placed in predetermined angular relationship with respect to said gaging surface. This angle is, of course, equal to the central angle desired between each notch on the index plate. It will be apparent now that adjusting screws in ears 43 and 44 may be used to make very fine adjustments of the sine bar while locating the same.

After placing sine bar 42 in predetermined angular location as described in the foregoing, means operatively associated therewith are provided to be brought into engagement with the index plate for effecting rotation thereof when sine bar 42 is arcuately moved to bring gaging pin 48 into contact with gaging surface 45.

Considering the broad aspects of the present invention, any means may be used to accomplish this, provided the same is adjustable independently of the sine bar and capable of being operatively associated therewith when desired. For the purpose of illustration in the present instance, an index lever 50, carrying pawl 51 is shown.

This index lever 50 is also mounted on sleeve 40 with its mounting portion in abutting relationship to the mounting portion of sine bar 42. The nut 52 and lock nut 53 threadably engaging the end of sleeve 40 adjacent index lever 50 retain said lever and sine bar on said sleeve. The mounting portion of lever 50 is split, as may be seen in Figure 1, and provides the integral, outwardly directed lugs 54 and 55 which may be urged together by means of bolt 56. It will, therefore, be appreciated that by loosening bolt 56, index lever 50 may be moved independently of sine bar 42 to allow pawl 51 to enter a notch in index plate 7, which is adjacent to the notch in engagement with grinding wheel 6. When pawl 51 is so positioned, the index lever may be positively secured to sleeve 40 for movement therewith by retightening bolt 56.

Pawl 51 is mounted on index lever 50 by means of handle 57 which pivotally supports the same. A spring 58 stretched between pin 59 on said pawl and pin 60 on said index lever serves to cause the pawl to remain in the notch in which the same is disposed. A conveniently accessible handle or lever 61 mounted in pawl 51, opposite the hooked end thereof, provides means for easily removing the same from a notch at the will of the operator.

Thus, after setting sine bar 42 in the manner described and index lever 50 to allow pawl 51 to enter a notch adjacent the one in which grinding wheel 6 is disposed, it is possible, after finishing said notch and removing grinding wheel 6, to rotate index plate 7 accurately and precisely through an angle equal to a central angle of the index plate, as determined by the number of notches therein, by rotating said index plate until gaging pin 48 contacts gaging surface 45. Inasmuch as index lever 50 is secured to sleeve 40 and sine bar 42 is also fixed thereto by means of holder 39, it is obvious that by means of handle 57 it is possible to arcuately move said sine bar and index lever serving to cause rotation of index plate 7 by virtue of pawl 51. When sine bar 42 has been moved in this manner to bring gaging pin 48 into contact with gaging surface 45, grinding wheel 6 is moved into the notch thus rotatably brought into position to receive the same, after which pawl 51 is removed from the notch in which it is presently positioned and moved again into a notch adjacent the one now to be finished; the sine bar and index lever simultaneously moving so that the operation may be repeated as many times as necessary to finish all the notches on said index plate.

It will be clear from the foregoing description that the indexing fixture shown in the drawings and described above has been illustrated and described in rather specific detail. Obviously, many modifications, changes, and departures from the above-described construction may be made without departing from the generic spirit and scope of the invention as set forth in the subjoined claims.

What is claimed is:

1. An indexing fixture comprising, a base, a gaging surface on said base, a spindle journaled in a housing on said base, said spindle adapted to rotatably mount a toothed workpiece, an arcuately movable sine bar mounted on said spindle to rotate therewith or independently thereof, gaging means carried by said sine bar to permit setting the same at a predetermined angle with respect to the plane of said gaging surface, means operatively associated with said sine bar and adapted to enter an interdental space on said workpiece, said means effecting rotation of said workpiece as said sine bar is arcuately moved to bring the gaging means thereon into contact with said gaging surface, and means to prevent rotation of said spindle when independent rotation of the sine bar is desired.

2. An indexing fixture, comprising, a base, a gaging surface on said base, a spindle journaled in a housing on said base, said spindle adapted to rotatably mount a notched index plate, an arcuately movable sine bar mounted on said spindle to rotate therewith or independently thereof, gaging means carried by said sine bar to permit setting the same at a predetermined angle with respect to the plane of said gaging surface, an arcuately movable index lever mounted on said spindle and operatively associated with said sine bar, means carried by said index lever adapted to enter an interdental space on said index plate, said means effecting rotation of said workpiece as said sine bar is arcuately moved to bring the gaging means thereon into contact with said gaging surface, and means to prevent rotation of said spindle when independent rotation of the sine bar is desired.

3. An indexing fixture comprising, a base, a gaging surface on said base, a spindle journaled in a housing on said base, said spindle adapted to rotatably mount a toothed workpiece, an arcuately movable sine bar mounted on said spindle to rotate therewith or independently thereof, gaging means carried by said sine bar to permit setting the same at a predetermined angle with respect to the plane of said gaging surface, an arcuately movable index lever mounted on said spindle, means carried by said lever adapted to enter an interdental space on said workpiece, said lever being movable to predetermined adjusted position independently of the spindle and sine bar to permit said means to be introduced into said interdental space and being co-operatively moved with said sine bar thereafter, said means effecting rotation of said workpiece as said sine bar is arcuately moved to bring the gaging means thereon into contact with said gaging surface, and means to prevent rotation of said spindle when independent rotation of the sine bar is desired.

4. An indexing fixture comprising, a base, a spindle journaled in said base adapted to rotatably mount a notched index plate, a collar mounted on said spindle having radially disposed holding means directed outwardly therefrom and adapted to rotate with said shaft or independently thereof, a sine bar mounted on said collar and adapted to register within the mounting means thereon, means in said mounting means to secure the sine bar for rotation with said collar, a gaging surface on said base, gaging means carried by said sine bar to permit setting the same at a predetermined angle with respect to the plane of said gaging surface, a pawl operatively associated with said sine bar and adapted to enter an interdental space on said index plate, said pawl effecting rotation of said workpiece as said sine bar is arcuately moved to bring the gaging means thereon into contact with said gaging surface, and means to prevent rotation of said spindle when independent rotation of the sine bar is desired.

5. An indexing fixture comprising, a base, a gaging surface on said base, a spindle journaled in a housing on said base, said spindle adapted to rotatably mount a notched index plate, an arcuately movable sine bar mounted on said spindle to rotate therewith or independently thereof, gaging means carried by said sine bar to permit setting the same at a predetermined angle with respect to the plane of said gaging surface, an arcuately movable index lever mounted on said spindle and operatively associated with said sine bar, a pawl carried by said lever adapted to enter an interdental space on said workpiece, means secured to said index lever and to said pawl to maintain the same in said interdental space until removed therefrom, said pawl effecting rotation of said workpiece as said sine bar is arcuately moved to bring the gaging means thereon into contact with said gaging surface, and means to prevent rotation of said spindle when independent rotation of the sine bar is desired.

LONDON T. MORAWSKI.

REFERENCES CITED

The following references are of record in the file of this patent:

UNITED STATES PATENTS

| Number | Name | Date |
| --- | --- | --- |
| 1,619,736 | Kaufmann et al. | Mar. 1, 1927 |